United States Patent [19]

Warner

[11] Patent Number: 4,639,000
[45] Date of Patent: Jan. 27, 1987

[54] AUTOMATIC ALIGNING CARTRIDGE MOUNT SEAL

[76] Inventor: Dale J. Warner, 3916 Belmoor Dr., Palm Harbor, Fla. 33563

[21] Appl. No.: 850,107

[22] Filed: Apr. 10, 1986

[51] Int. Cl.⁴ ............................................. F16J 15/34
[52] U.S. Cl. ...................................... 277/41; 277/83; 277/93 SD; 277/87
[58] Field of Search .................................. 277/38–41, 277/82, 83, 87, 93 R, 93 SD, DIG. 8

[56] References Cited

U.S. PATENT DOCUMENTS

| 2,419,588 | 4/1947 | Pasco | 277/87 X |
| 3,035,841 | 5/1962 | Riester | 277/83 X |
| 3,841,642 | 10/1974 | Kirker | 277/40 |

FOREIGN PATENT DOCUMENTS 692165 8/1964 Canada ................................. 277/41
784708 10/1957 United Kingdom ................. 277/87

Primary Examiner—Robert S. Ward
Attorney, Agent, or Firm—Hill, Van Santen, Steadman & Simpson

[57] ABSTRACT

A cartridge mount seal includes a unitary sleeve structure for telescopically receiving a seal ring adapter therein, the sleeve structure being sealed to a shaft and to the seal ring adapter. Automatic alignment of a stationary unit to the rotary unit is provided by way of an O-ring which slightly engages the outer surface of the sleeve during mounting of the stationary unit. The stationary unit includes a floating seal member for automatic alignment of the stationary and rotary seal faces. Distortion of the sleeve during clamping thereof to the shaft and centering of the sleeve are provided by a centering screw structure which radially sets the sleeve with respect to a reference surface on the stationary unit.

13 Claims, 2 Drawing Figures

AUTOMATIC ALIGNING CARTRIDGE MOUNT SEAL

CROSS REFERENCE TO RELATED APPLICATIONS

This application is related to the following applications:
Ser. No. 850,115 filed Apr. 10, 1986;
Ser. No. 850,095, filed Apr. 10, 1986; and
Ser. No. 850,111 filed Apr. 10, 1986.

BACKGROUND OF THE INVENTION

1. Field of the Invention

The present invention relates to shaft seals and is particularly concerned with automatic alignment of the rotating and stationary seal faces in a shaft seal.

2. Description of the Prior Art

The present invention relates to a family of seals which have been developed in order to overcome specific objections to seals heretofore offered in the seal industry.

Inasmuch as this the first disclosure of this family of seals, it is believed to be pertinent at this time to discuss the art, the drawbacks of the art and the resolutions of the problems heretofore encountered in the art.

The seal disclosed herein, and in fact the family of seals based thereon, are compatible with the various corrosive fluids being processed in the petroleum refining, petroleum transportation, high-pressure steam generation, high temperature, high pressure chemical production as well as other common mediums being proposed through centrifugal rotary pumps.

Metal components are preferably 316 and 316L stainless steel with the rotating face being primarily a P-658RC carbon with a stationary face of 99.5% alumina ceramic or silicon carbide. The O-rings will be of Viton ® in temperature environments of −20° F.–400° F., or EPR in water solution and temperature environments of −65° F.−+300° F. (tetrafluorethylene can also be used where necessary to withstand corrosive effects chemical solutions which are injurious to synthetic rubber compounds). Typically, the stock sizes will range from 0.875" shaft to 4.750" shaft.

Some of the current problems being encountered with the state-of-the-art seals presently available on the market are:

(a) Shaft fretting by the rotating unit;
(b) Installation of seals on shafts fretted or worn from previous use of packing;
(c) Uneven face wear or leakage due to
Location of the secondary O-ring and anti-rotation lugs, and
The torque applied to the seal faces during operation results in excursion of the seal face (wobble) resulting in the faces wearing conically, with excessive wear rate, with the introduction of foreign matter between the faces and excessive fretting on the O-ring surfaces arising;
(d) Start-up-shutdown leakage and accelerated face wear due to thermo-distortion of the carbon faces, caused by the differential and thermal-expansion between the seal components with physical damage in the component configuration which results in the fact that the flat faces of the carbon element assuming a flat-convex-concave surface during changes in temperature and further resulting in progressive leakage, excessive P.V. values and excessive wear of the carbon face for each start-stop cycle;
(e) Set screws for driving the rotational seal in the sleeve provide for uneven and tightening and can shift the seal off center or result in the sleeve being out of round causing the seal to rotate with a wiping action verses running a true concentric track and increasing the wear and the introduction of foreign matter between the faces.

SUMMARY OF THE INVENTION

The object of the present invention is to provide a new seal, in particular a new family of seals, in which the above problems are obviated.

According to the invention, the above disadvantages are eliminated and/or countered by providing a new shaft seal concept which does not provide fretting of the shaft and can be installed on fretted shafts without modification or sleeves.

The new seal structure provided according to the present invention minimizes the uneven face wear by locating the secondary O-ring supporting the carbon face and the anti-rotational drive lugs much closer to the sealing faces and on the same plane.

With respect to the start-up shutdown leakage, the seal constructed in accordance with the present invention operates with a much improved concentricity to the shaft, while at the same time maintaining the rotating face and the stationary face parallel and square to the axis of the shaft.

Seals constructed in accordance with the present invention also reduce the thermo-distortion by a factor of 9.

Also, seals constructed in accordance with the present invention provide a heavier cross-section in order to avoid strip threads and minimized distortion.

Seals constructed in accordance with the present invention also provide for a multiple spring structure for uniform face loading, springs which are available on the market, such as Hastaloy ® springs, a movement of the O-ring to a clean surface as the seal wears, hydraulic balance to maintain proper pressure-velocity face loads, anti-rotation lug configuration to prevent bayoneting or lockup of the seal due to lug wear, and shorter overall length to facilitate installation.

According to a particular feature of the invention, a stationary part of a seal comprises an O-ring structure which serves a dual purpose, namely it provides a centering structure for installation and a secondary seal for safety purposes when the primary seal structure begins to leak because of wear and the like. As to installation, it was heretofore common practice to provide shims of plastic about the shaft and mount the stationary portion of the seal on on the plastic shims for centering. The stationary portion is then secured to the machine housing and the plastic shims are removed. With the present invention, an O-ring structure is provided for receiving the shaft therethrough and supporting the stationary portion of the seal on the shaft for fastening to the machine without the necessity of the shims.

In the event of leakage from the primary seal structure, the O-ring structure initially used for centering responds to a high pressure due to the leakage to cause deformation of the O-ring and emergency sealing to prevent excessive leakage until such time as the primary seal can be repaired.

The primary and specific object of the present invention is to provide a self-aligning cartridge mount seal structure in which the stationary seal unit comprises a floating seal member mounted in the manner of a ball joint or ball and socket arrangement in which the floating member automatically aligns itself with the seal ring of the rotary unit, and in which the seal includes a centering structure by which the rotary unit is centered with respect to the shaft and is in conjunction with and using a datum established on the stationary unit, and in which the internal drive, bias and seal structures of the rotary unit are at the same location and as near as possible to the interface of the rotary seal ring and the floating seal member.

The radius of automatic adjustment is centered on the plane of the seal faces and the axis of rotation of the shaft, and may engage, on the stationary member, a conical surface or a spherical surface described by the relationship $$R = \sqrt{(b-r)^2 + (A-r)^2} + r$$

where R is the spherical radius, b is the axial length of the floating member, A is the outer radius of the floating seal member and r is the radius of the outer surface of the floating seal member extending from the annular outer surface to a surface perpendicular thereto.

The sleeve structure includes inner and outer sleeves integrally sealed together and defining a gap therebetween for receiving an end of the seal ring adapter which mounts the seal ring. The gap includes shaped sections of the adapter and the sleeve structure for receiving complementary shaped drive pins and bias springs which provide sufficient adapter material for a rigid sealing surface for an O-ring carried by the sleeve structure.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
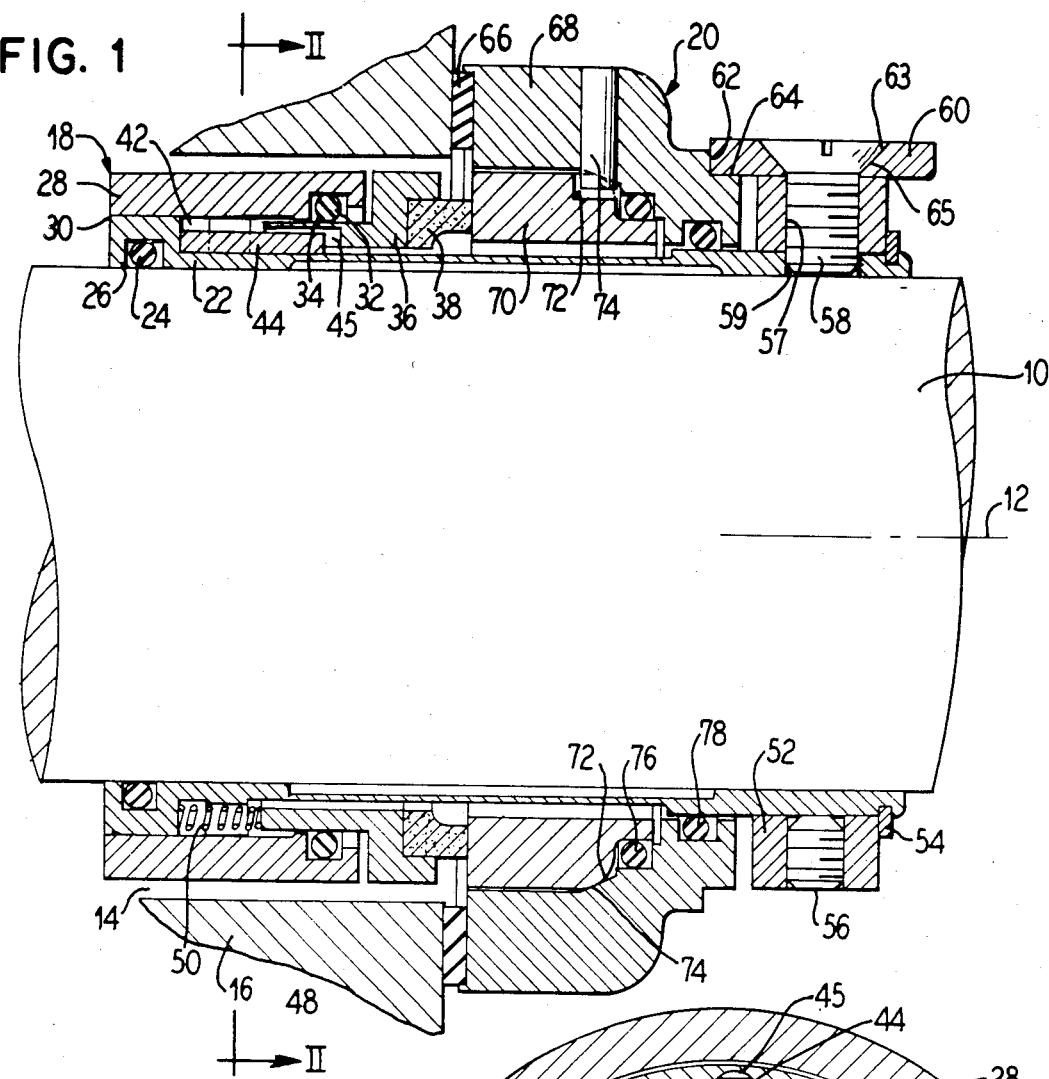
FIG. 1 is a longitudinal sectional view of a cartridge mount self-aligning seal constructed in accordance with the present invention.

Referring to the drawing, a cartridge-mount seal is shown mounted on a shaft 10 which rotates about an axis 12 which extends through an opening 14 in a wall 16 of a machine.

The seal comprises two major components, namely a rotary unit 18 and a stationary unit 20.

The rotary unit 18 comprises a sleeve 22 which is sealed to the shaft 10 by an O-ring 24 disposed in a groove 26. A further sleeve 28 is mounted over the sleeve 22 and is made integral therewith by welding all around at the junction 30.

The sleeve 28 includes an inner O-ring 32 located in a groove 34 which seals to the outer surface of a seal ring adapter 36 carrying a seal ring 38.

Figure 2:
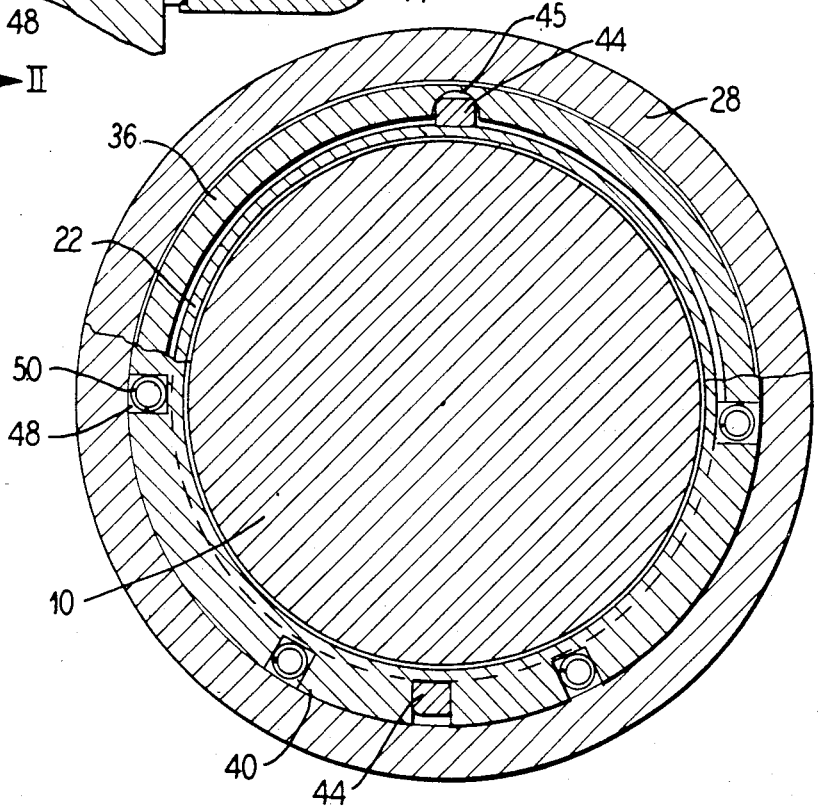
FIG. 2 is a sectional view taken generally along the line II—II of FIG. 1.

The adapter 36 is locked in driving engagement with the sleeve 22 and 28 by way of a plurality of drive pins 44 located in groove formed in an inner annular rib 40 located between an annular groove 42 and an annular groove 46 which extends to the groove 34. As best seen in FIG. 2, the drive pins 44 comprise a flat bottom surface, a flat top surface, a pair of flat side surfaces, and a further pair of side surfaces which are arcuate and which extend between the side surfaces and the top surface. By the same token, the groove formed in the rib 40 has flat sides for engaging the flat surfaces of the drive pin while the adapter is provided with arcuate grooves 45 for engaging the arcuate grooves in the seal ring adapter 36.

The adapter 36 and the seal ring 38 are urged toward the stationary unit 20 by way of a plurality of springs 50 located in a like plurality of grooves 48 circumferentially spaced about and extending through the rib 40. As shown, the ends of the springs bear against a forward face of the sleeve 22 and the facing end of the adapter 36.

With the above structure, the drive pins, springs and O-ring 32 are located together and the O-ring 32 is disposed as close as possible to the seal ring adapter 36 and the seal ring 38.

A locking ring 52 is provided at the opposite end of the sleeve and axially limited by a ring 54.

The locking ring 52 is provided with a plurality of threaded bores for receiving a like plurality of set screws 56 (only one shown) for applying a locking pressure to the sleeve 22 to secure the same to the shaft 10 for rotation there- with.

In order to prevent lopsided distortion of the sleeve 22 as could happen, for example, if three set screws 56 are screwed so as to apply uneven forces to three circumferentially spaced points. The locking ring 52 is therefore provided with a plurality of further threaded bores 57 aligned with corresponding bores 59 through the sleeve for receiving a like plurality of centering screws 58 (only one shown) which may be tapped screws or, as shown, a flat head screw or the like having a washer 60 for engaging a radial limit surface 64 and an axial limit surface 62 of the stationary unit 20. The radial dimension of the surface 64 and the length of the screw 58 are selected such that when the screw is fully set with its surface 65 engaged with the countersink surface 63 of the washer 60, the rotary unit 18 is centered on the shaft 10. After centering, the set screws 56 may be tightened.

The stationary unit 20 provides the self-aligning feature and comprises a cup-shaped member 68 which is sealed to the machine wall 60 by way of a gasket 66 and a conventional seal gland (not shown) which secures the stationary unit 20 to the machine.

The cup-shaped member 68 has a floating seal 70 disposed therein and locked against rotation by way of an anti-rotation pin 74 received in a groove 72 in the floating seal 70.

The cup-shaped member 68 comprises a surface 72 of continuously changing diameter, preferably conical or spherical, for engaging a rounded surface 74 of the floating seal 70. The engagement is basically in the form of a line contact and the floating member 70 automatically aligns its sealing surface parallel to the sealing surface of the seal ring 38 and perpendicular to the axis of rotation of the shaft. Any slight misalignment of the seal ring 38 is therefore automatically adjusted on a one-time basis.

The cup-shaped member 68 and the floating member 70 are provided with a O-ring seal 76. In addition, a further O-ring seal 78 is provided in an internal groove in the cup-shaped member 68 and functions in a dual roll. First of all, the slight frictional engagement of the O-ring 78 with the outer surface of the sleeve 22 provides for centering of the cup-shaped member and obviates the necessity of using and removing plastic shims or the like during installation. Secondly, the O-ring 78 functions as a restrictor or safety seal to minimize leakage due to wear of the primary seal.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A cartridge mount seal for mounting on and sealing a rotatable shaft which extends through an opening in a machine wall, comprising:
   a rotary seal unit including sleeve means for extending through the opening in the machine wall and for sealingly receiving the shaft therethrough, a seal ring, a seal ring adapter mounting said seal ring, drive means coupling said seal ring adapter to said sleeve means, and bias means urging said seal ring adapter and seal ring towards the opening in the machine wall;
   a stationary unit for sealed attachment to the machine wall and including a cup-shaped stationary member sealingly mounted on said sleeve means, a chamber in said stationary member including an inner surface of changing diameter, a floating seal member in said chamber and about said sleeve means, said floating seal member sealingly engaging said seal ring and sealed to said cup-shaped stationary member, and anti-rotation means coupling said stationary and floating members, said floating seal member including an arcuate surface for engaging said inner surface in a line contact for automatic alignment of said floating seal member parallel to said seal ring and perpendicular to the axis of rotation of the shaft; and
   means for securing said sleeve means to the shaft for rotation therewith.

2. The cartridge seal of claim 1, wherein said securing means comprises:
   a lock ring removably mounted on said sleeve means adjacent said stationary member, said lock ring including first and second pluralities of circumferentially spaced bores therethrough;
   a third plurality of circumferentially spaced bores through said sleeve means aligned with said first plurality of bores;
   centering surface means on said stationary member at a predetermined radius for the axis of rotation;
   a plurality of threaded removable fasteners each including an end and an engagement surface for engaging said centering surface means as said first fastener is threaded through the respective first and third bores to engage said shaft with said end and center said rotary unit;
   a plurality of set screws for threading through said second threaded bores to engage said sleeve means and clamp the same against the shaft, said removable fasteners then being removed.

3. The cartridge seal of claim 2, wherein said centering surface means comprises:
   a peripheral surface on said stationary member.

4. The cartridge seal of claim 3, wherein each of said removable fasteners comprises:
   a flat head screw including a bevel surface; and
   a washer including a central aperture for receiving said flat head screw, and a complemental bevel surface for engaging said bevel surface of said flat head screw.

5. The cartridge seal of claim 2, and further comprising:
   a peripheral groove in said sleeve means;
   a retaining ring in said peripheral groove as a stop for said lock ring in the axial direction;
   stop surface means on said stationary member; and
   a further engagement surface on each of said removable fasteners for engaging said stop surface means.

6. The cartridge seal of claim 5, wherein said stop surface means comprises:
   a radially extending surface on said stationary member.

7. The cartridge seal of claim 1, wherein said sleeve means and said adapter comprise:
   a first sleeve for receiving the shaft therethrough and including a first section for extending through the machine wall and a larger diameter second section;
   a second sleeve sealingly mounted on said second section of said first sleeve and extending partially over said first section to define a gap therebetween;
   first and second ends on said adapter, said first end mounting said seal ring and said second end received in said gap;
   an annular inner rib on said second sleeve extending into said gap;
   a plurality of first grooves and a plurality of second grooves extending through said rib circumferentially spaced apart;
   a plurality of third grooves in said second end of said adapter aligned with said plurality of first grooves;
   a plurality of drive pins in said first and third grooves to constitute said drive means; and
   a plurality of springs in said plurality of second grooves bearing against said second section of said first sleeve and said second end of said adapter and constituting said bias means.

8. The cartridge seal of claim 7, and further comprising:
   a peripheral inner groove in said second sleeve;
   an outer surface on said second end of said adapter radially spaced from said third grooves; and
   an O-ring in said inner groove sealing said sleeve means and said outer surface.

9. The cartridge seal of claim 7, wherein said sleeve means comprises:
   a peripheral inner groove in said second section of said first sleeve; and
   an O-ring in said grooves for sealing said sleeve means to the shaft.

10. The cartridge seal of claim 7, and further comprising:
    a peripheral weld sealing and joining said first and second sleeves as a unitary structure.

11. The cartridge seal of claim 1, wherein said anti-rotation means comprises:
    an elongate axially-extending slot in said floating member; and a radially-extending pin connected to said stationary member and received in said slot.

12. The cartridge seal of claim 1, and further comprising:
an O-ring disposed in said chamber and engaging said stationary and floating members.

13. The cartridge seal of claim 1, and further comprising:
a tubular extension on said stationary member;
an inner peripheral groove in said tubular extension; and
an O-ring in said groove for engaging said sleeve means.

* * * * *